United States Patent [19]

Taylor

[11] 3,898,117
[45] Aug. 5, 1975

[54] METHOD OF MAKING PATTERNED COMPOSITE MATERIAL

[76] Inventor: Louis N. Taylor, 1035 N.E. 176 St. North, Miami Beach, Fla. 33162

[22] Filed: Jan. 23, 1973

[21] Appl. No.: 325,993

Related U.S. Application Data

[62] Division of Ser. No. 148,111, May 28, 1971, Pat. No. 3,728,203.

[52] U.S. Cl. .............. 156/163; 156/183; 156/220; 156/222; 156/229; 156/300; 156/265
[51] Int. Cl. ............................................ B32b 31/00
[58] Field of Search ............ 156/183, 229, 299, 84, 156/85, 86, 163, 300, 264, 265, 164, 197, 227; 161/39, 40, 50, 74, 76, 77, 116, 132, 145, 156, 128, 129; 2/220, 231

[56] References Cited
UNITED STATES PATENTS

| | | | |
|---|---|---|---|
| 2,122,251 | 6/1938 | Hartmann | 156/163 |
| 2,125,495 | 8/1938 | French | 156/163 |
| 2,502,772 | 4/1950 | Winstead | 156/163 |
| 2,905,581 | 9/1959 | Maxey | 156/163 |
| 3,560,292 | 2/1971 | Butter | 156/229 |
| 3,617,418 | 11/1971 | Miller | 156/227 |

*Primary Examiner*—Charles E. Van Horn
*Assistant Examiner*—Jerome Massie
*Attorney, Agent, or Firm*—Gipple & Hale

[57] ABSTRACT

A method for manufacturing decorative material comprising the steps of positioning a base material, stretching a plurality of elastic members and placing and securing the stretched elastic members in a spaced relationship to each other on the base material. The stretched elastic members are allowed to relax causing the front of the base material to gather. The gathered composite material is then pressed under pressure. The composite fabric manufactured by the above-disclosed method has a specific contoured pattern in which the areas of the material opposite the applied elastic members are gathered in a wrinkled configuration and the areas adjacent to the elastic members are slightly depressed from the plane of the gathered areas.

6 Claims, 5 Drawing Figures

Fig. 5
Fig. 4
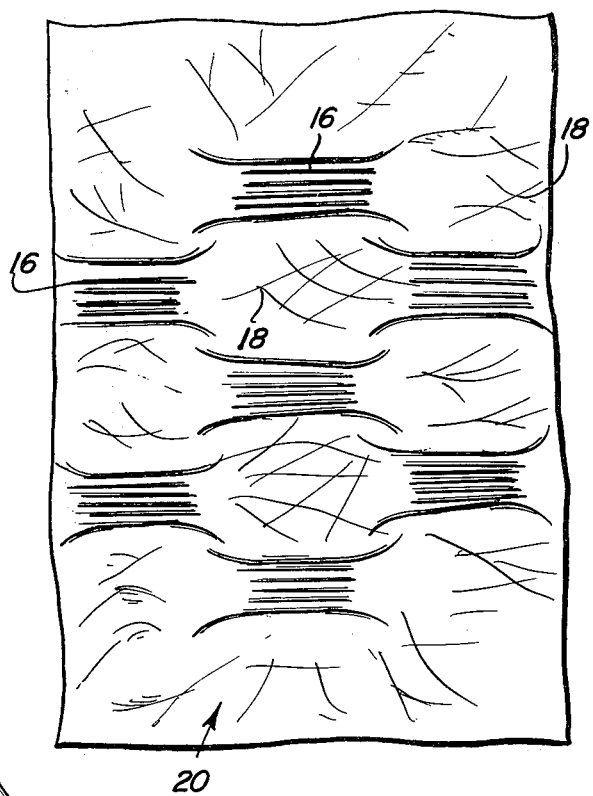

METHOD OF MAKING PATTERNED COMPOSITE MATERIAL

This is a division of application Ser. No. 148,111, filed May 28, 1971, now U.S. Pat. No. 3,728,203.

The present invention generally relates to a patterned composite material and more specifically to a novel and improved sculptured material and to the process for making it. The sculptured material of the invention has an unusual decorative pattern through a novel process which causes the material to take on an attractive gathered look. The novel process converts the surface of the material from a standard relatively planar surface to an irregular undulating, alternately raised and lowered surface, creating an attractive and unique appearance. The above-mentioned material is especially conducive to the manufacture of purses, in that the economical, decorative material is easily applied to the purse body to provide a handsome, contoured appearance.

Other features and advantages of the invention will be apparent from the following description of the embodiments of the invention as shown in the accompanying drawings.

BRIEF DESCRIPTION OF THE DRAWINGS

FIG. 4 is a top plan view of the base material shown in FIG. 3.

FIG. 5 is a perspective view of a purse made from the composite material shown in FIG. 4.

DESCRIPTION OF THE PREFERRED EMBODIMENT

Figure 1:
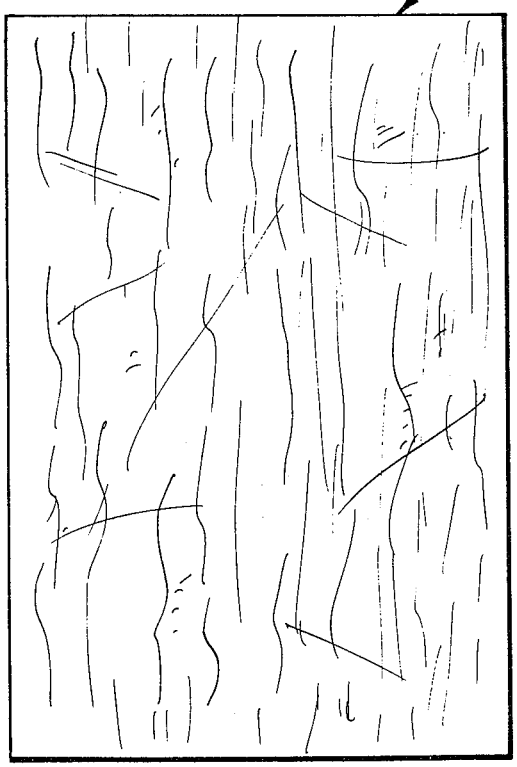
FIG. 1 is a top plan view of the base material before it has been processed.

As shown in FIG. 1, a piece of base material 10 of a vinyl composition is used, although plastic materials or fabrics of a natural or synthetic composition can be substituted. While the base material 10, as shown, is of a single layer, it should be noted that the material can be a composite of several different layers of material comprising any desired combination. However, the base material used is preferably relatively unstretchable. The base material 10 is preferably carried by a base or a supply roller, not shown, and is removed from the roller and placed on a processing area. An elastic web from a separate supply roller is preferably cut into a plurality of elastic members 12 having ann approximately 2-inch square configuration. The elastic web can be made of any elastic material provided the elastic material has sufficient elasticity to return to its original configuration after the elongating stresses are relieved.

The advantage of using a plurality of separate elastic members 12 of small size with the base material 10 is that a tougher composite material 20 is created with the elimination of "puffing" which occurs when a large elastic web is used.

The square elastic members are then stretched approximately 1 inch, or to a set desired distance, depending upon the elasticity of the elastic material used and the nature of the base material 10. Adhesive is then applied to the elastic members. The elastic members are secured to the back of the base material 10 at spaced apart intervals of approximately 1 inch. The elastic members can be overlapped or preferably positioned adjacent each other in staggered relation such as that shown in FIG. 3.

In the preferred embodiment, each of the elastic members is preferably stretched in substantially one direction. The stretched elastic members 12 are designated by the numeral 14. The pattern of the composite material 20 can be changed depending on whether the constrictive reaction of the elastic members 12 is in a lengthwise or crosswise direction or a combination of both. Additional pattern changes can be provided by the substitution of different geometric shapes and spacings of the elastic members.

Figure 3:
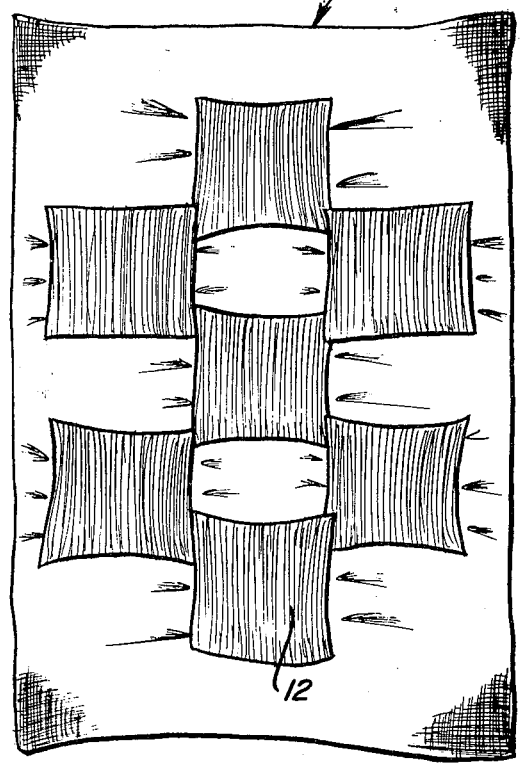
FIG. 3 is a plan view of the back of the base material of FIG. 2 after the elastic members have been allowed to resume a relaxed position.
Figure 2:
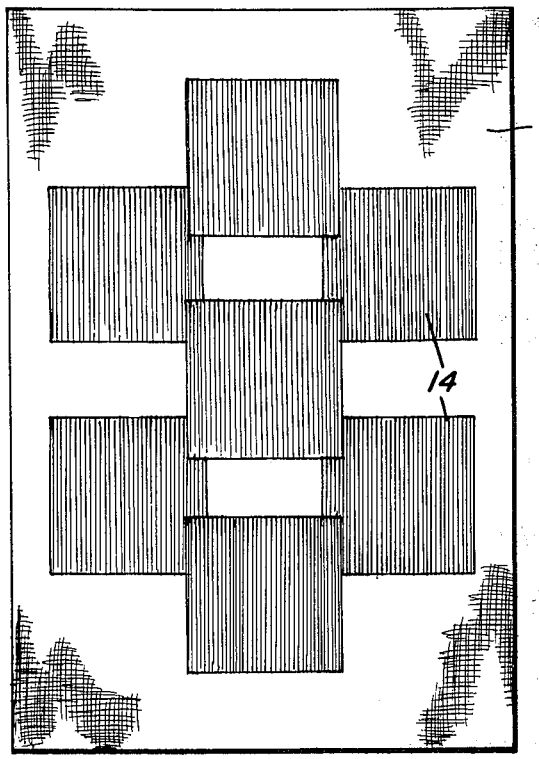
FIG. 2 shows the application of stretched elastic members to the back of the base material shown in FIG. 1.

When the stretched elastic members 12, secured to the base material 10, return to their relaxed or normal configuration, the adhesively secured base material 10 is caused by the constrictive reaction of the elastic members 12 to gather and assume the corresponding position of the relaxed elastic members, as shown in FIG. 3. After the elastic members 12 have relaxed, the front of the finished composite inventive material 20 takes on a decorative patterned or contoured look, as shown in FIG. 4.

As shown in FIG. 4, the gathered areas 16 of the base material form a wrinkled, ridge-like appearance, while the adjacent areas 18, which are not secured to the elastic members, take on a depressed configuration having a somewhat smoother appearance.

Alternatively, adhesive can be applied to the back of the material and the elastic members placed thereon. The adhesive applied to the elastic members 12 can be placed on the members in the stretched or unstretched position. The adhesive can be directly applied by a conventional spreading device or sprayed on, depending on the particular type of adhesive apparatus used, or can be predeposited on the elastic web.

The gathered composite material 20 is then run through a rubber fast-roller press, or other suitable pressing means, under pressure so that a permanency in the adhesion of the bond between the elastic members 12 and the base material 10 is achieved, while, in addition, simultaneously crinkling or wrinkling the gathered material into substantially permanent patterns. The patterned composite material 20 is then cut into pieces of various configurations. The cut pieces are placed onto the skeleton or body of a purse or other suitable item and are sewn or glued to the skeleton or body to form the item desired, as, for example, the purse 22 shown in FIG. 5. The process is preferably done in small-lot approach, because it is easier to do pieces for the right size of the pocket book or other small sized items.

While the preferred embodiment of the invention has been disclosed, it is understood that the invention is not limited to such an embodiment since it may be otherwise embodied in the scope of the appended claims.

What is claimed is:

1. A method of manufacturing a decorative composite material comprising the steps of positioning a flexible base material; stretching a plurality of elastic members; adhesively securing said plurality of stretched elastic members in a predetermined spaced relationship on said base material so that the edges of said elastic members are in a substantially parallel relationship;

forming a checkered pattern; allowing said stretched elastic members to relax, causing said base material to gather in its greatest amount opposite said elastic members; and pressing said gathered composite material comprising the base material and plurality of secured elastic members to crinkle the gathered composite material into a substantially permanent pattern.

2. The method according to claim 1, wherein said plurality of elastic members are individually stretched, placed and secured in a parallel spaced relationship to each other on said base material.

3. A method of manufacturing a patterned composite material comprising the steps of positioning a flexible sheet material adapted to be gathered in at least one direction in a predetermined position, stretching a plurality of individual rectangularly shaped elastic strip members, placing said elastic strip members in a stretched condition on said sheet materials so that each strip member contacts at least two other strip members with at least two strip members being positioned in line and spaced apart to form a space therebetween and at least one strip member being positioned a spaced distance to either side of the center axis of said two in line strip members substantially adjacent said space, adhesively securing said stretched elastic strip members to said sheet material, allowing said elastic strip members to return to substantially their original dimensions after being stretched so that said plurality of elastic strip members forms a gathered composite pattern on said sheet material by carrying the sheet material opposite the strip members into a gathered configuration and applying pressure to said gathered material to wrinkle the gather material into a substantially permanent pattern.

4. The method according to claim 3 including the step of applying adhesive to said elastic strip members and placing said strip members on said flexible member spaced apart from each opposite in line strip member at an interval of substantially 1 inch.

5. A method of manufacturing a decorative composite material comprising the steps of carrying a flexible plastic base material to a process area, placing a plurality of separate stretched elastic members on the back of the flexible plastic base material, adhesively securing said stretched elastic members to the back of the plastic base material at spaced intervals to form a substantially checkerboard pattern allowing said stretched elastic members to return their relaxed configuration causing the front of the flexible plastic base material to gather and placing the gathered composite material comprising flexible plastic base material and elastic members under pressure suitable to achieve a permanency in the adhesion of the bond between the elastic members and the plastic base material and form the gathered material into a substantially permanent pattern.

6. A method of manufacturing a decorative composite material comprising the steps of carrying a flexible material to a processing area and positioning the flexible material so that work can be performed upon it, carrying an elastic web into the processing area, cutting the elastic web into a plurality of separate elastic members, stretching the elastic members a designated distance, adhesively securing said plurality of stretched elastic members by adhesive means to the back of the flexible material to form a plurality of enclosed spaces having substantially parallel alignment, allowing said stretched elastic members to return to their relaxed configuration, placing the gathered composite material comprising the flexible material and secured elastic members under pressure to achieve a pemanency in the adhesion of the bond between the elastic members and the flexible material while simultaneously crinkling the gathered composite material into a permanent pattern.

* * * * *